April 7, 1970          D. T. BRAY          3,505,215
METHOD OF TREATMENT OF LIQUIDS BY REVERSE OSMOSIS
Filed Oct. 10, 1968
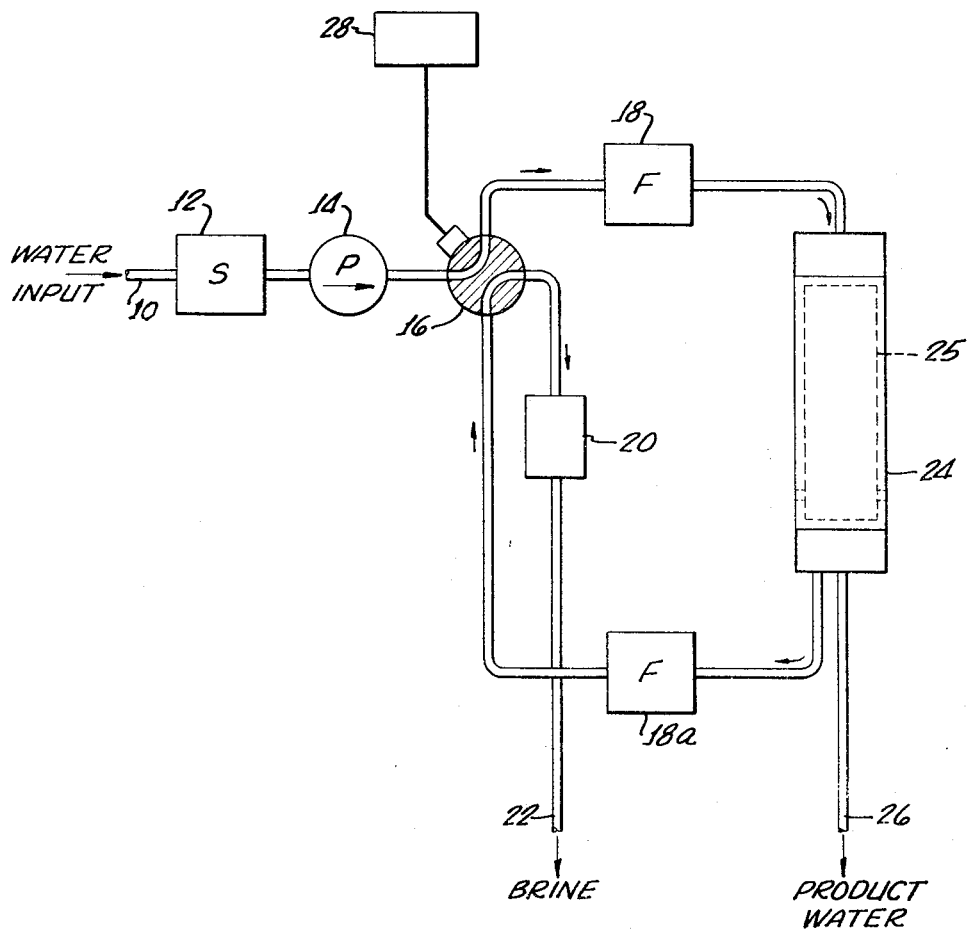
INVENTOR.
DONALD T. BRAY
BY
AGENT

United States Patent Office 3,505,215
Patented Apr. 7, 1970

3,505,215
METHOD OF TREATMENT OF LIQUIDS BY REVERSE OSMOSIS
Donald T. Bray, Escondido, Calif., assignor to Desalination Systems, Inc., Escondido, Calif., a corporation of California
Filed Oct. 10, 1968, Ser. No. 766,463
Int. Cl. B01d 11/04
U.S. Cl. 210—22     7 Claims

ABSTRACT OF THE DISCLOSURE

A spiral wound semipermeable membrane module in a reverse osmosis system is prevented from telescoping, due to pressure exerted by solution being treated against a particulate matter build-up at the end of the module, by passing the solution to be treated through a first filter, then through the semipermeable membrane module, then the concentrate or brine is passed through a second filter and out to waste through a back pressure regulator valve. The effective openings in the filters are of diameter less than the hydraulic diameter of the channels in the membrane module and preferably from 5% to 75% of such channel diameter. Periodically the flow of liquid is reversed through the filters and module so that the back flushing action during each reversed flow period cleans the filter that has previously collected debris during the previous opposite direction flow period.

---

This invention relates to treatment, which may be the purification or concentration, of liquids by reverse osmosis.

The principles of reverse osmosis are now becoming well recognized. An impure solution is applied at elevated pressure to one side of a semipermeable membrane and employment of suitable high pressure results in purified water being forced through the membrane, with concurrent production of a brine or solution more concentrated with respect to salts originally contained in the impure solution.

In general, a suitable membrane support is employed which will provide exposure of the proper membrane surface for contact with the impure solution, and means for supporting the membrane while allowing flow-through of purified product water. A control valve or regulator is employed to regulate the flow of liquid and outflow of brine while maintaining operating pressure of the feed solution at the membrane working face. A screen or strainer for preliminary treatment of the impure feed solution is advantageously employed to protect the pump.

A suitable membrane and its support is referred to in the art as a spiral wound membrane module. Such modules are described in various publications issued by the U.S. Department of the Interior, Office of Saline Water; particularly on pages 42 and 43 of the report entitled 1964 Saline Water Conversion Report, and similar reports issued in 1965 and 1966. In brief, the module comprises a semipermeable membrane folded back on itself and with inner surfaces separated by a porous sheet, this assembly being wound around a perforated central tube with convolutions separated by a porous screen. Impure water enters through one end of the cylindrical membrane pack through the edge of the screen and is distributed over the membrane surfaces by the screen. Purified water passing through the membrane flows into a central collecting tube. Brine flows out of the other end of the module through the opposite end screen edge apertures. The module is encased in a suitable container from which the outflow of brine is controlled by a valve or regulator to maintain desired release rate and to maintain pressure of impure water in the spiral wound module.

Reverse osmosis systems using the spiral wound membrane concept often do not operate well on feed water that contains particulate material. The particulate material tends to collect at the inlet end of the module building up a layer or cake, which causes resistance to water flow and a pressure drop across this layer. As the pressure differential across this layer increases above a few pounds per square inch, the force exerted tends to "telescope" the membrane pack with one or more layers being displaced longitudinally with respect to adjacent layers. When this sliding displacement amounts to more than a few hundredths of an inch per layer the membrane may be torn loose from its central support tube, from other layers to which it is adhesively fastened, or the membrane may rupture resulting in complete failure of the module.

Various methods have been proposed to eliminate or reduce the severity of this failure mechanism. One is to support the outer spiral wrap so that it cannot move relative to the inner wrap which is glued to the central tube. This increases the pressure drop necessary to cause telescoping but does not prevent the intermediate convolutions from sliding. Another way is to brace the outlet end of the module against a porous support which may be fastened rigidly to the module central tube or other suitable part of the structure. This can help, but due to slack in the central part of the module, the inlet end may telescope without corresponding distortion of the outlet end. This, in fact, is the case in many if not most telescope type failures. Yet another approach is to use carefully filtered feed water. This is by far the best method but while it may be feasible for large size plants, it poses a severe economic problem in smaller installations, since often the filters must be renewed or elements replaced at frequent intervals.

The type of particulate material is also of importance. Relatively little difficulty is encountered if the feed contains hard, granular particles. If these particles are appreciably smaller than the hydraulic flow channels in the module, then they readily pass on through and out with the brine. If they are substantially larger than the flow channels in the module they will be stopped at the module inlet to form a relatively porous "pebble" bed which is not particularly harmful. Real difficulty arises when the water contains soft gelatinous materials, for example, algae, or stringy or plate like particle forms. A particularly difficult combination is gelatinous material together with very fine clays or colloids. These rapidly plug the module inlet.

Module diameter and required minimum brine side velocity also compound the problem to an extent that telescoping failure has heretofore appeared to be an important and fundamental limitation in systems using large diameter spiral wound membrane modules.

Summarized briefly, this invention contemplates a method for treating a liquid using a spiral wound semipermeable membrane module and in which telescoping effect from particulate material in the liquid to be purified is eliminated or substantially reduced. This is accomplished by passing the liquid to be treated through a first filter having openings of effective diameter less than the hydraulic diameter of the channels in the membrane module. Then the liquid is passed edgewise through the membrane module, in one side and out the other; and is then passed through a second filter having openings also of effective diameter less than the hydraulic diameter of the channels in the membrane module. Periodically the direction of the flowing liquid through the system is reversed so that the impure feed liquid passes in opposite direction first through the second filter (as previously identified), then in opposite direction through the membrane module, and then in opposite direction through the first filter. The back flushing action during each period of reversed flow back-washes and cleans the filter that has previously collected debris or particulate matter during the previous opposite direction flow period. Thus no harmful particulate matter reaches the module to cause plugging or telescoping, and the flow cycles effectively clean the filters with each flow reversal.

In order that the passage of liquid through the module in each direction shall be reasonably equal with correspondingly equal filtration effect, it is preferred to arrange for substantially equal periods of flow in each direction through the module. This may be accomplished by manual control of suitable valves, or by automatic control which will insure efficient unattended operation. In a more specific embodiment, flow reversal is accomplished by a four-way valve activated by a timing device. Such an embodiment is illustrated in the simple schematic drawing annexed hereto.

In the drawing, the water input is shown at 10, the water first passing through a coarse screen strainer 12. Strained water is raised to elevated pressure by pump 14, the high pressure water line being connected to four-way valve 16 to which are also connected the inputs or outputs to filters 18 and 18a Also connected to four-way valve 16 is back pressure regulator or flow control valve 20, from which brine flows to waste through connection 22. Filters 18 and 18a are connected also to the input or output ends, depending of course on the direction of flow therethrough, of desalination unit 24, which contains a spiral wound membrane module 25. Purified product water is produced from an end output connection 26 from unit 24. Timer 28 is arranged to activate four-way valve 16 so that for a predetermined period of time the water input from 10 will be through filter 18 into desalination unit 24, then out of this unit and through filter 18a, then through the four-way valve again and out through the connection to back pressure regulator valve 20. Periodically timer 28 will activate valve 16 to connect the water input from 10 to filter 18a through which it flows in the opposite direction from the previous flow, then through desalination unit 24 and filter 18 in the opposite direction, and then through valve 16 again and out to connection with regulator valve 20. The timer will advantageously be arranged to reverse the flow through filters 18 and 18a and desalination unit 24 periodically after substantially equal time intervals.

Preferably the connections between the four-way valve 16 and the filters, and these elements and the desalination unit are made as short as possible. This is because on each flow reversal there is some contamination of the input water with brine from the output of the desalination unit operating during the previous cycle. Short connections will reduce co-mingling of these solutions to a minimum. Additionally, it is advantageous to arrange that each flow cycle be of a period so that liquid flow through the desalination unit is at least 10 times the volume of liquid in the connection lines (between the valve and the filters and the desalination unit) and in the filters and the purification unit. This will reduce the effect of retained liquid during each flow reversal.

The size of the effective openings in the filters 18 and 18a, that is the first and second filters referred to hereinbefore and in the claims, is critical to obtain desired operating results. These openings are of effective diameter less than the hydraulic diameter of the channels in the membrane module and preferably from 5% to 75% of the module hydraulic channel diameter. The openings must be less than the module hydraulic channel diameter to prevent particles larger than the module channel openings reaching these and plugging them. Openings less than about 5% of the diameter of the module channel openings will generally be so small that a large amount of fine particles will be collected on the filters which would otherwise pass through the module without harm. The filters may therefore become coated and inefficient after a short period of water flow. The module channel hydraulic diameter is dependent on the plastic screen which is placed between membrane convolutions to provide for water passage. The type of screen, diameter of strands, and effective openings created thereby will determine the hydraulic diameter of the channels.

In order to protect the pump and other equipment employed in the process of this invention it is advantageous to first pass the feed water through a suitable coarse strainer as illustrated at 12 in the drawing. This strainer should have openings larger than the openings in filters 18 and 18a and it functions to strain out any undesirably large particles which may enter with the feed water input to the pump which might damage the pump, or affect operation of the four-way valve.

The following example illustrates a specific embodiment of the practice of the method of this invention, with apparatus employed being of type illustrated in the drawing.

EXAMPLE 1

A spiral wound membrane module is enclosed in a suitable casing to form a desalination unit illustrated in the drawing at 24. The module is fed with impure water of 1000 p.p.m. TDS as at 10 in the drawing, and the feed passed through a 12 mesh strainer 12, then fed to pump 14 where its pressure is raised to 400 p.s.i.g. The high pressure output of pump 14 leads selectively to either filter 18 or 18a through four-way valve 16, filters 18 and 18a being of conventional cartridge type with effective openings of 25 microns (0.001″) or less. Filters 18 and 18a are connected, as shown in the drawing, to ends of desalination unit 24 which has inside a spiral wound membrane module 25 having flow channels through the module of about 150 microns hydraulic diameter. The hydraulic diameter of the module channels is set by use of a special plastic screen separating membrane and porous spacer cloth convolutions, this plastic screen being of 12 mesh and of strands approximately 0.015″ diameter. These strands are straight and as they cross each other at 90° they do not bend appreciably down around each other, thereby providing fluid channels about 0.010″ by 0.070″ between parallel strands. This screen when wound into the membrane module provides flow channels through the module of hydraulic diameter of about 150 microns. Thus the filters 18 and 18a have openings about 16% of the hydraulic diameter of the flow channels through module 25.

Four-way valve 16 is controlled by clock operated timer 28 to provide a flow reversal through the filter and module system every 2 hours. The volume of water passed during this time is about 50 times the volume of water in the plumbing connections, the filters, the module, and the four-way valve.

Brine released from the module 25 passing through either filter 18 or 18a (depending on the setting of four-way valve 16 at the time) is regulated by flow control valve 20 to maintain 400 p.s.i.g. in the system, and is finally passed to sewer from connection 22. Product water passing through the module membrane contains about 100 p.p.m. TDS and is collected and discharged from desalination unit 24 through product water connection 26.

The filters 18 and 18a, being effectively back-washed and cleaned every two hours have a long effective life and the membrane module 25 in desalination unit 24 being provided with a water feed having no particles of diameter which would not pass readily through its flow channels, will be free from telescoping and pressure distortion.

The periodic reversal of flow through the filters and the membrane module is effective to insure a properly filtered water input to the membrane pack. The input filter becomes gradually coated wtih debris during one flow cycle but is automatically back-washed and cleaned by reverse flow of liquid therethrough during the following cycle when its position in the circuit and the flow is reversed. Thus one filter is protecting the membrane pack while the other filter is being washed clean. Since, under these conditions, particles do not tend to deposit on the edge or end of the membrane module, telescoping or distortion from applied water pressure is substantially reduced or completely avoided.

I claim:
1. A method for purifying a liquid by reverse osmosis in which said liquid is passed through a spiral wound semipermeable membrane module, the outflow of brine from the other end of said module being regulated to maintain liquid pressure in said module, and purified water passing through said semipermeable membrane is collected, in which the improvements comprise:
   (a) passing said liquid to be purified through a first filter having effective openings of diameter less than that of the hydraulic diameter of the channels in said module; then,
   (b) passing said filtered water to be purified edgewise into one end of said membrane module and out of the other end of said module as brine; then,
   (c) passing said brine through a second filter having effective openings of diameter less than that of the hydraulic diameter of the channels in said module; and,
   (d) periodically reversing the flow of said liquid so that liquid to be purified passes in opposite direction first through said second filter, then in opposite direction through said module, and the brine then passes in opposite direction through said first filter, thereby the back flushing action during each reversed flow period cleans the filter that has previously collected debris during the previous opposite direction flow period.

2. A method according to claim 1 in which the time periods for each reversed flow period are substantially equal.
3. A method according to claim 1 in which the liquid flow reversal is controlled by a four-way valve activated by a timing device.
4. A method according to claim 3 in which said four-way valve and said filters and said module are connected by short connections to reduce the liquid retained in connection lines during flow reversal.
5. A method according to claim 1 in which the effective openings in said first filter and said second filter are from 5% to 75% of the hydraulic diameter of the channels in said module.
6. A method according to claim 1 in which the said liquid to be purified is first passed through a strainer having openings coarser than the openings in said filters.
7. A method according to claim 1 in which the period of flow in each direction is sufficient to permit liquid flow through the module amounting to at least 10 times the volume of liquid retained in connection lines, the said filters and said membrane module, during flow reversal.

References Cited

UNITED STATES PATENTS

| | | | |
|---|---|---|---|
| 2,571,247 | 10/1951 | Huebotter | 210—321 X |
| 3,228,877 | 1/1966 | Mahon | 210—321 X |
| 3,355,382 | 11/1967 | Huntington | 210—321 X |

J. L. DE CESARE, Primary Examiner

U.S. CL. X.R.

210—82, 138, 321